(12) United States Patent
Monks

(10) Patent No.: US 12,452,371 B2
(45) Date of Patent: Oct. 21, 2025

(54) EXPEDITING A SUPPORT CALL BASED ON PRECEDING ELECTRONIC ACTIVITY

(71) Applicant: Praia Health Inc., Renton, WA (US)

(72) Inventor: Robin Monks, Snohomish, WA (US)

(73) Assignee: Praia Health Inc., Chicago, IL (US)

( * ) Notice: Subject to any disclaimer, the term of this patent is extended or adjusted under 35 U.S.C. 154(b) by 281 days.

(21) Appl. No.: 18/297,812

(22) Filed: Apr. 10, 2023

(65) Prior Publication Data

US 2024/0340377 A1 Oct. 10, 2024

(51) Int. Cl.
*H04M 3/42* (2006.01)
*H04M 3/51* (2006.01)
*H04M 3/523* (2006.01)

(52) U.S. Cl.
CPC ..... *H04M 3/5235* (2013.01); *H04M 3/42042* (2013.01); *H04M 3/5183* (2013.01)

(58) Field of Classification Search
None
See application file for complete search history.

(56) References Cited

U.S. PATENT DOCUMENTS

| | | | | |
|---|---|---|---|---|
| 6,975,720 | B1 * | 12/2005 | Crook | H04Q 3/64 |
| | | | | 379/266.01 |
| 8,781,103 | B2 * | 7/2014 | Baranovsky | H04W 4/20 |
| | | | | 379/265.09 |
| 9,894,199 | B1 * | 2/2018 | Wiechman | H04M 3/42068 |
| 11,374,925 | B2 * | 6/2022 | Krishnamurthy | H04W 4/16 |
| 2006/0109974 | A1 | 5/2006 | Paden et al. | |
| 2018/0241884 | A1 * | 8/2018 | Converse | H04M 3/42042 |
| 2020/0322482 | A1 * | 10/2020 | Sena, Jr. | H04W 4/16 |
| 2020/0366788 | A1 * | 11/2020 | Gupta | H04L 63/0838 |

FOREIGN PATENT DOCUMENTS

| | | | |
|---|---|---|---|
| KR | 20080036376 | A | 4/2008 |
| KR | 101440527 | B1 | 9/2014 |
| KR | 20150089116 | A | 8/2015 |

OTHER PUBLICATIONS

International Search Report and Written Opinion, dated Jul. 18, 2024, for International Patent Application No. PCT/US2024/023693. (9 pages).

* cited by examiner

*Primary Examiner* — Quoc D Tran
(74) *Attorney, Agent, or Firm* — Seed Intellectual Property Law Group LLP

(57) ABSTRACT

A facility for assisting in the handling of a telephone call is disclosed. The facility receives the telephone call. As part of the telephone call, the facility receives a supplemental dialing sequence, and discerns a value to which the supplemental dialing sequence corresponds. The facility uses the discerned value to retrieve information relevant to the use of a user computing system placing the telephone call, and causes the retrieved information to be displayed to a person to whom the received call is routed.

20 Claims, 13 Drawing Sheets

*FIG. 12*

| dynamic caller code | expires | userid | authentication level | calling number | intent |
|---|---|---|---|---|---|
| 542678 | 3/20/2023 7:58:42 | 45646545 | 3 | 206-741-9632 | billing inquiry |
| 546785 | 3/20/2023 8:07:21 | 96419821 | 3 | 425-936-9876 | schedule appointment |
| 551428 | 3/20/2023 8:08:02 | 84971839 | 2 | 206-234-1234 | technical support |
| ... | | | | | | dynamic caller code table — 1200
1201, 1202, 1203
1211, 1212, 1213, 1214, 1215, 1216

EXPEDITING A SUPPORT CALL BASED ON PRECEDING ELECTRONIC ACTIVITY

BACKGROUND

Many organizations use call centers to provide support to people, such as their customers or users. While some kinds of support can be provided without learning and verifying the caller's identity, in many cases a call to a call center begins with the caller providing first information about who they are, and second information proving that this is true. For example, one caller may speak their name, library card number, and mother's maiden name, either to a human support agent or an automatic response system. A second caller may key in their drivers license number, expiration date, and birthdate. This level of identity authentication may be required by a call center to, for example, access or change information stored about the person by the organization, or give instructions to the organization.

BRIEF DESCRIPTION OF THE DRAWINGS

FIG. 12 is a table diagram showing sample contents of a dynamic caller code table used by the facility in some embodiments to store dynamic caller codes that have been assigned by the facility and the associated information.

DETAILED DESCRIPTION

Figure 1:
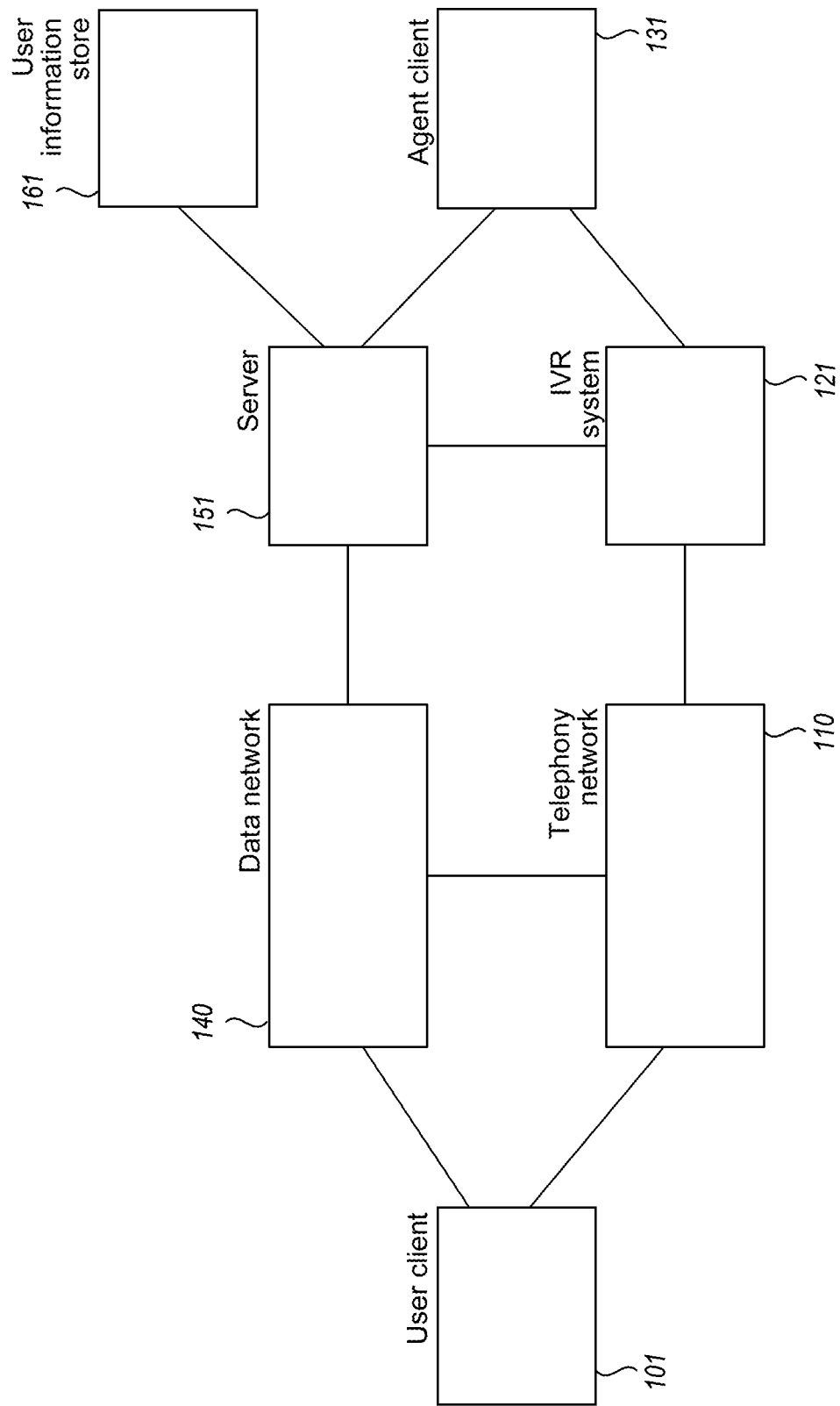
FIG. 1 is a network diagram showing a network environment in which the facility operates in some embodiments.

The inventor has recognized that it can often be unpleasant and inefficient to perform identity authentication at the beginning of a call center call.

The inventor has further recognized that many people place calls to call centers after spending time seeking to address their concern on a website or in a mobile app provided by the organization. The person's explanation to the call center agent of their purpose for calling is sometimes redundant with the actions the person has taken on the website or in the app, adding to the overall time and frustration the person incurs in getting their issue addressed.

In response to these recognitions, the inventor has conceived and reduced to practice a software and/or hardware facility for expediting a support call based on preceding electronic activity ("the facility").

The facility incorporates into a website or mobile app provided by the organization a control—such as a button—that the user of the website or mobile app can activate to place a call center call. The keypress sequence that the website or mobile app uses to dial the call center call begins with the phone number of the call center, followed by supplemental digits that are received by an interactive voice response ("IVR") system that answers the call center call. The supplemental digits provide information that can expedite the call center call.

In various embodiments, the supplemental digits provide different combinations of three kinds of information for expediting the call. Where the user has taken action to make their identity known to the website or app—such as by registering with the app on installation, or signing into or providing a stored userid cookie value to the website—the supplemental digits can provide the user's identity, which can be used to retrieve and display to the agent information about the user, such as information about their account or electronic health record. Where the user has authenticated their identity to the website or mobile app before placing the call, the supplemental digits can provide that authentication status, which can subsequently be used to reduce or forego authentication that would ordinarily be performed manually by the call center agent or automatically by the IVR. Where the user has performed interactions with the website or mobile app that may reflect the user's purpose in interacting with the website or mobile app and placing the call center call, the supplemental digits can provide information about those interactions, or a prediction of intent derived from them. Information about these interactions are sometimes referred to herein as "context" for the call.

In some embodiments, the information provided by the supplemental digits is directly encoded into the supplemental digits by the website app—hereafter "client"—for decoding by the facility after their receipt by the IVR. For example, each piece of information can be encoded in a different contiguous span within the supplemental digits. Supplemental digits directly encoded in this way are sometimes called "autonomous caller codes." In some embodiments, without encoding this information for telephone dialing, the client uses a data connection between the client and a server on which the facility operates to transmit the information to the server. In response, the server stores the information in connection with an arbitrary identifier, and returns this arbitrary identifier to the client via the data connection. The client uses the arbitrary identifier as the supplemental digits it transmits to the IVR via dialing, and the facility uses the arbitrary identifier to retrieve the stored information. Such arbitrary identifiers are sometimes called "dynamic caller codes."

In some embodiments, the facility users callerid information received by the IVR in connection with the call instead or in addition to identity and/or authentication information provided using the supplemental digits.

By operating in some or all of the ways described above, the facility uses information collected by the calling device to expedite and/or focus the call.

Additionally, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by expediting each call, the facility can reduce the amount of time the involved equipment is committed to each call, such as the client device, the voice calling network—including connections and switches—the IVR system, and the computer system and telephone equipment used by the agent to participate in the call. This reduces energy consumption by each of the involved devices and, for battery-powered devices, extends the time for which the battery will provide energy to the device before recharging.

FIG. 1 is a network diagram showing a network environment in which the facility operates in some embodiments. A user client device 101 used by the user can connect to a telephony network 110, and/or a data network 140. The user client can connect to these networks in a variety of ways, such as by using a wired Ethernet connection, a wired plain old telephone service connection, a wireless telephony connection, a wireless data connection, etc. In some embodiments, the user client can place a telephone call by contacting the telephone network through the data network, such as by using a voice over IP connection. The telephony network is connected to and capable of conducting telephone calls with an IVR system 121. The data network and the IVR system are connected to a server 151, which has access to a user information store 161, such as on a separate storage server, or a storage device connected more directly to the server. An agent client 131 used by an agent to whom the user's telephone call is delegated is connected to and can access both the server and the IVR system.

Figure 2:
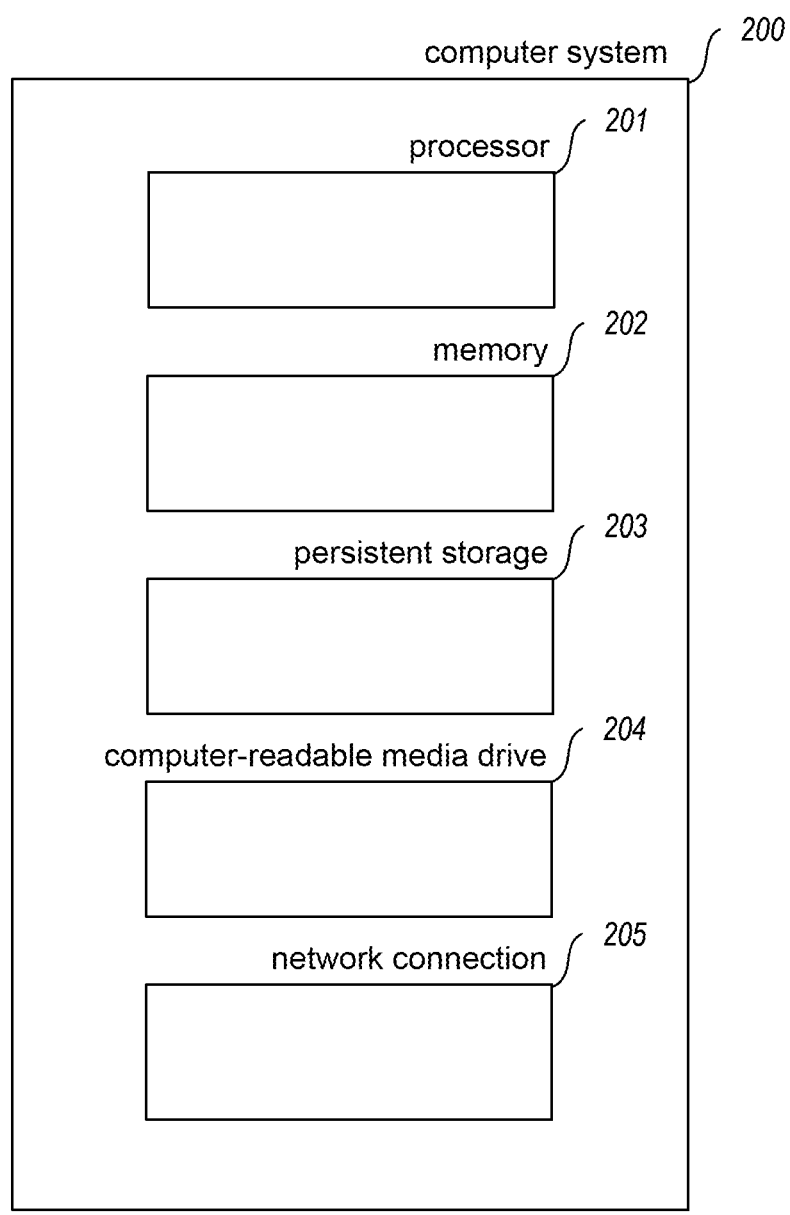
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 201 for executing computer programs and/or training or applying machine learning models, such as a CPU, GPU, TPU, NNP, FPGA, or ASIC; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. In some embodiments, the network connection serves as a connection to a telephony network for placing, receiving, and conducting telephone calls, and/or is accompanied in the device by a separate component serving this purpose. While computer systems configured as described above are typically used to support the operation of the facility, those skilled in the art will appreciate that the facility may be implemented using devices of various types and configurations, and having various components.

Figure 3:
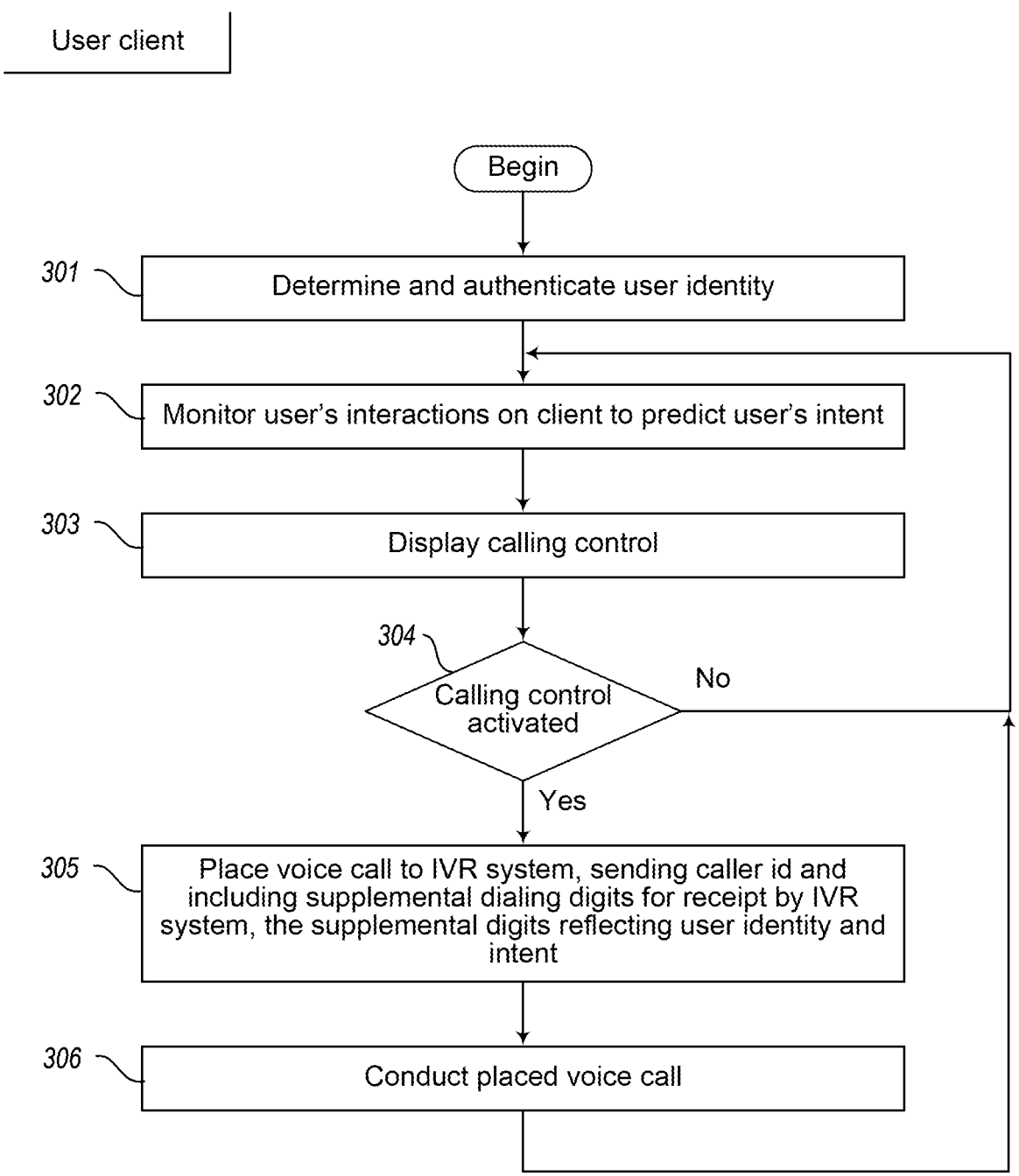
FIG. 3 is a flow diagram showing a process performed by the facility in the user client to place a support call.

FIG. 3 is a flow diagram showing a process performed by the facility in the user client to place a support call. In various embodiments, the facility performs this process in programs of different types executing on the user client, such as a mobile app provided for the organization, a desktop app provided for the organization, a browser processing a webpage for the organization, etc.

In act 301, the facility determines and authenticates the identity of the user. In some embodiments, the facility collects both identity and identity authentication information at the same time; in some embodiments, the facility identifies the user at a first time, such as when the user is installing the app or desktop application running it for the first time—or when the user is logging into the website for the first time—and then periodically performs authentication at a later time, such as when the user launches the app or application or accesses the website each time. In various embodiments, the facility uses a variety of approaches to identifying and authenticating the user, such as receiving a username/password pair; collecting biometric information, such as any combination of face or iris image, fingerprint, voice, hand geometry, blood vessel pattern, gait, or typing pattern; or presentation of a software or hardware security key that is registered to the user.

In act 302, the facility monitors the user's interactions on the client as a basis for predicting the user's intent in their use of the client. In various embodiments, the facility uses a variety of information that may reflect the user's intention, such as the most recent page visited by the user; a sequence of pages visited by the user; a sequence of actions of other types performed by the user, such as typing, selecting items from lists, pressing buttons, speaking, capturing or uploading photos, audio sequences and/or video sequences, etc. In various embodiments, the facility uses a variety of techniques to predict the user's intention from this information, including applying a trained machine learning model; applying an editorial mapping from this information to intents; etc.

Figure 4:
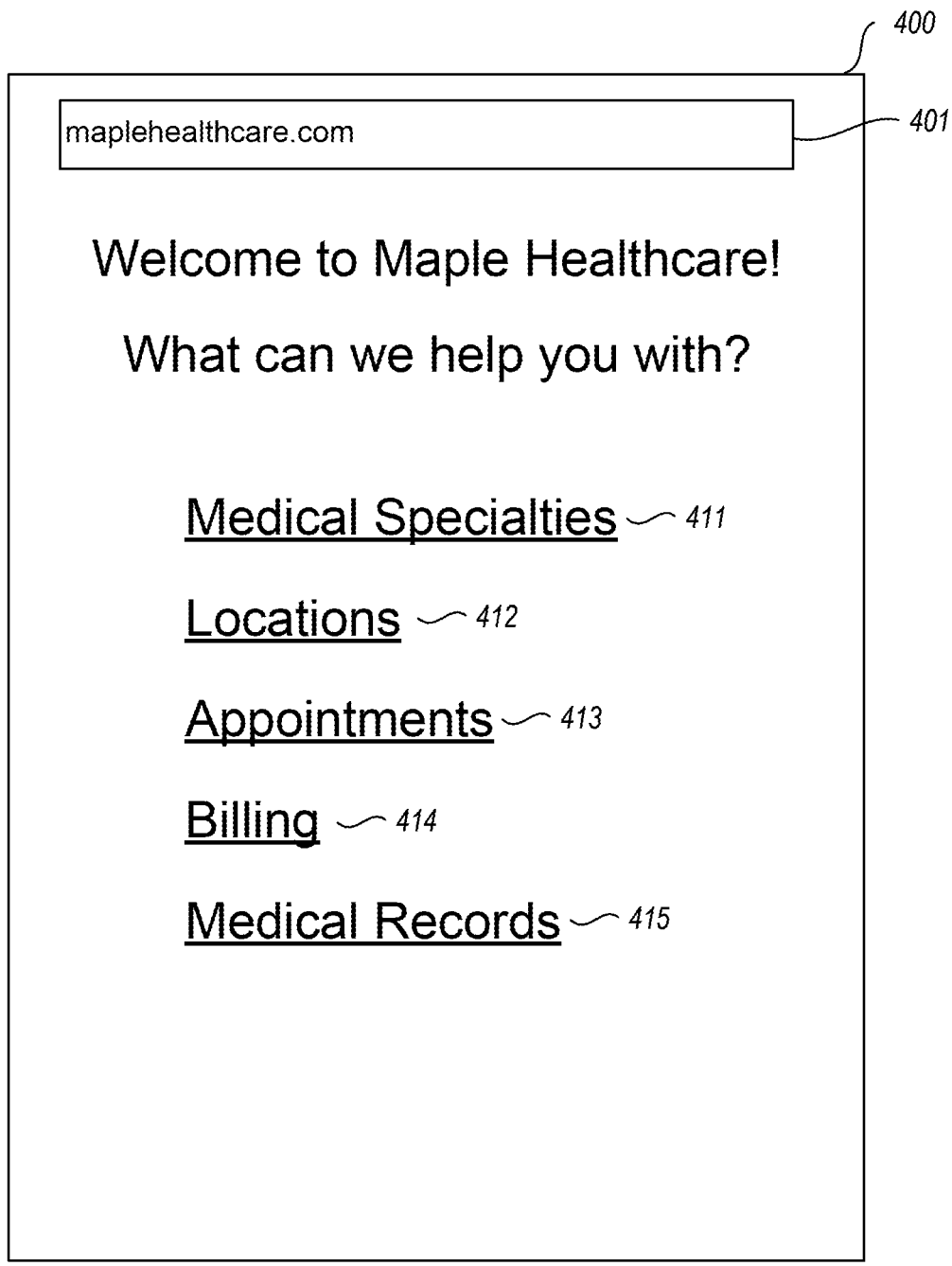
FIG. 4 is a display diagram showing a first sample display presented by the facility in some embodiments to provide for navigation of the client by the user.
Figure 5:
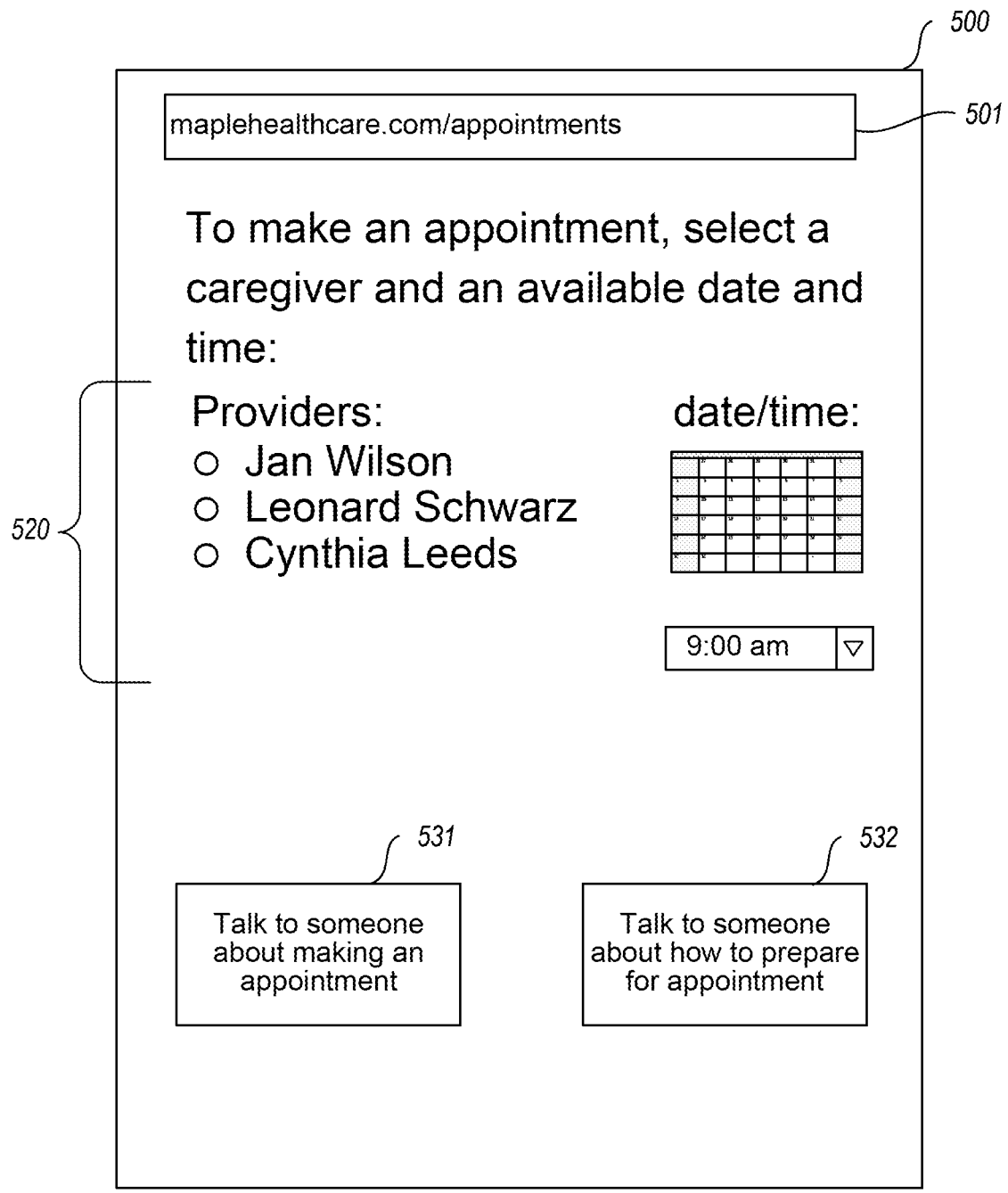
FIG. 5 is a display diagram showing a second sample display presented by the facility in some embodiments to provide functionality relating to appointments.

In act 303, the facility displays a calling control. FIGS. 4 and 5 discussed below show a user interface of the client in which the facility monitors the user's interactions as part of act 302, and displays a calling control as part of act 303.

FIG. 4 is a display diagram showing a first sample display presented by the facility in some embodiments to provide for navigation of the client by the user. The display 400 shows a URL 401 for this page, as well as a set of links 411-415 that the user can follow in order to navigate to different pages or sections of the client app or website. For example, the user can activate link 413 to navigate to an appointments section.

While FIG. 4 and each of the display diagrams discussed below show a display whose formatting, organization, informational density, etc., is best suited to certain types of display devices, those skilled in the art will appreciate that actual displays presented by the facility may differ from those shown, in that they may be optimized for particular other display devices, or have shown visual elements omitted, visual elements not shown included, visual elements reorganized, reformatted, revisualized, or shown at different levels of magnification, etc.

FIG. 5 is a display diagram showing a second sample display presented by the facility in some embodiments to provide functionality relating to appointments. The second display 500 chose a URL 501 for this page, which corresponds to the selection of link 413 shown in FIG. 4. The page further includes a section 520 populated with controls that the user can use to perform a self-service scheduling of their own appointment with a provider. The page also includes two dialing buttons 531 and 532. The user can activate dialing button 531 in order to place a support call to obtain assistance in scheduling an appointment. The user can activate control 532 to place a support call to obtain additional information about how to prepare for an upcoming appointment.

Returning to FIG. 3, in act 304, if a calling control displayed by the facility in act 303 is activated, then the facility continues in act 305, else the facility continues in act 302 to continue its monitoring of the user's interactions. In act 305, the facility places a voice call to the IVR system, sending caller id reflecting the telephone number of the user client device and including supplemental dialing digits for receipt by the IVR system after the call is connected. These supplemental digits reflect, in one way or another, context information for the support call such as the identity of the user and the user's intent. As is discussed in greater detail below, this information can be encoded in the supplemental digits, or the supplemental digits can provide a way to retrieve this information from a source other than the voice call.

In various embodiments, the facility establishes this dialing sequence containing the supplemental digits before act 303 so that they can be included in the displayed calling control, or after act 304 so that they are available to process the activation of the calling control. In the example shown in FIGS. 4 and 5, in some embodiments the facility determines an intent based on one or more of the presence of activated dialing button 531 on the appointments page 500; the user's progression through the welcome page 400, then the appointments page 500; and/or the selection of calling button 531 rather than calling button 532.

After act 305, the facility conducts the voice call placed in act 305, permitting the user and an agent to whom the user's support call is routed to communicate. After act 306, the facility continues in act 302.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 6:
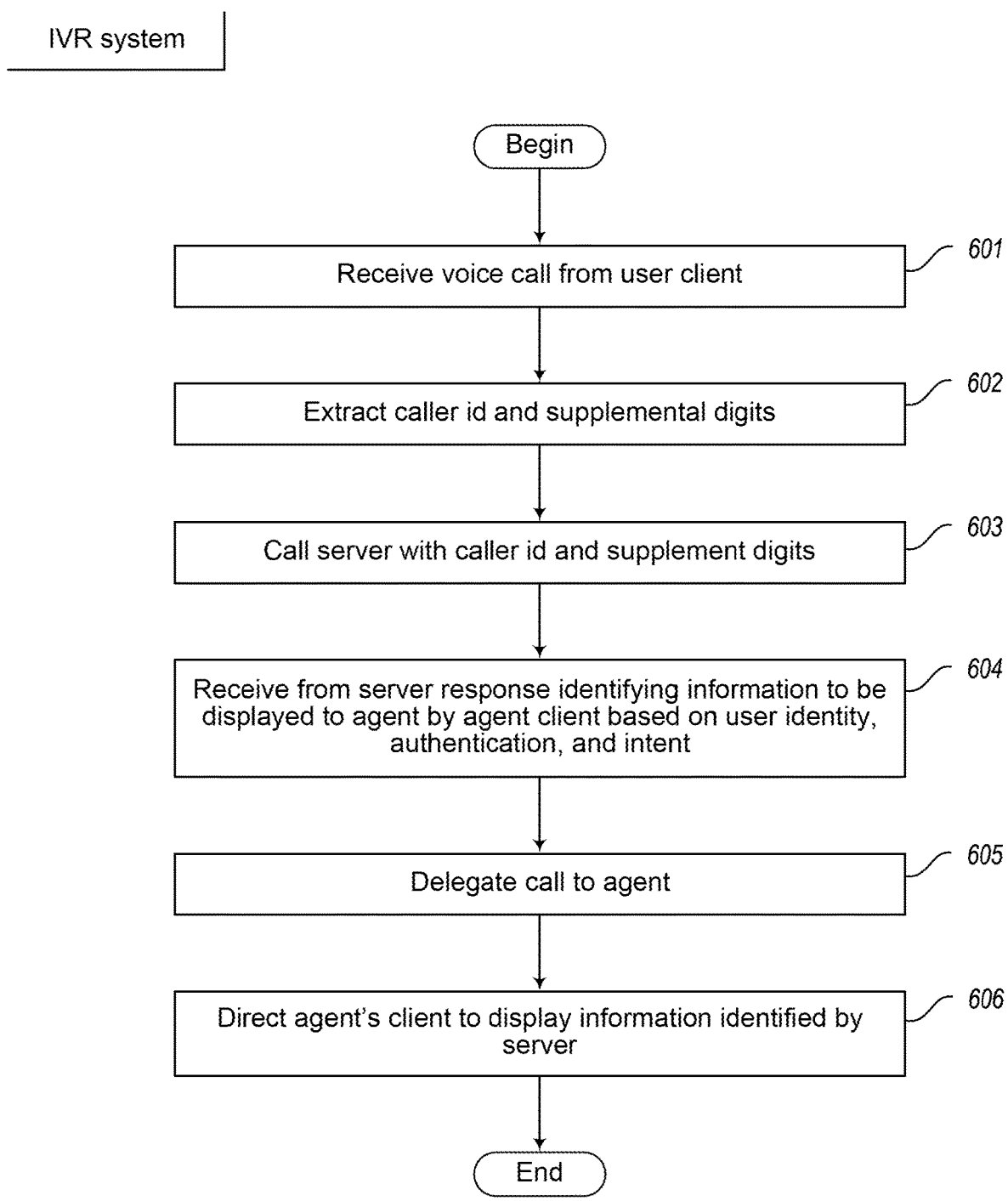
FIG. 6 is a flow diagram showing a process performed by the facility in the IVR system in some embodiments in response to receiving a support call from the user client.

FIG. 6 is a flow diagram showing a process performed by the facility in the IVR system in some embodiments in response to receiving a support call from the user client. In act 601, the facility receives the voice call from the user client. In act 602, the facility extracts a caller id telephone number and supplemental dialing digits from the received voice call. In act 603, facility calls the server, providing the extracted caller id and supplemental digits. In act 604, the facility receives from the server a response to the call of act 603 that identifies information to be displayed to the agent by the agent client based upon the identity of the user placing the call, their level of identity authentication, and available information about their intent. For example, in accordance with the example shown in FIG. 4 and in response to the user activating control 531 in FIG. 5, the response received from the server contains information about the user, and in particular, information that will assist the agent in making an appointment on the user's behalf. Additionally, the received information contains an indication that the user is fully identified and authenticated, and the agent need not further interact with the user to identify the user or authenticate the user's identity.

In act 605, the facility delegates the support call to a particular agent. In various embodiments, the facility uses a variety of approaches to perform this delegation, including choosing an agent who has been idle the longest, choosing an agent who has participated in support calls for the smallest percentage of their present work shift, selecting an agent who is fluent in a natural language known to be spoken by the user, selecting an agent who has special skills or training in dealing with users having the same intent as has been predicted for this user, selecting an agent whose assistance is the least costly, etc. Delegation of the call to this agent involves routing the voice call from the IVR system to a physical phone or a soft phone used by the agent. In act 606, the facility directs the agent client of the agent to whom the call is delegated in act 605 to display the information identified by the server in the response received in act 604. At this point, the agent to whom the call was delegated and the user can proceed with the support call, relying on the information displayed to the agent about the support call on the agent's agent client. After act 606, this process concludes.

Figure 7:
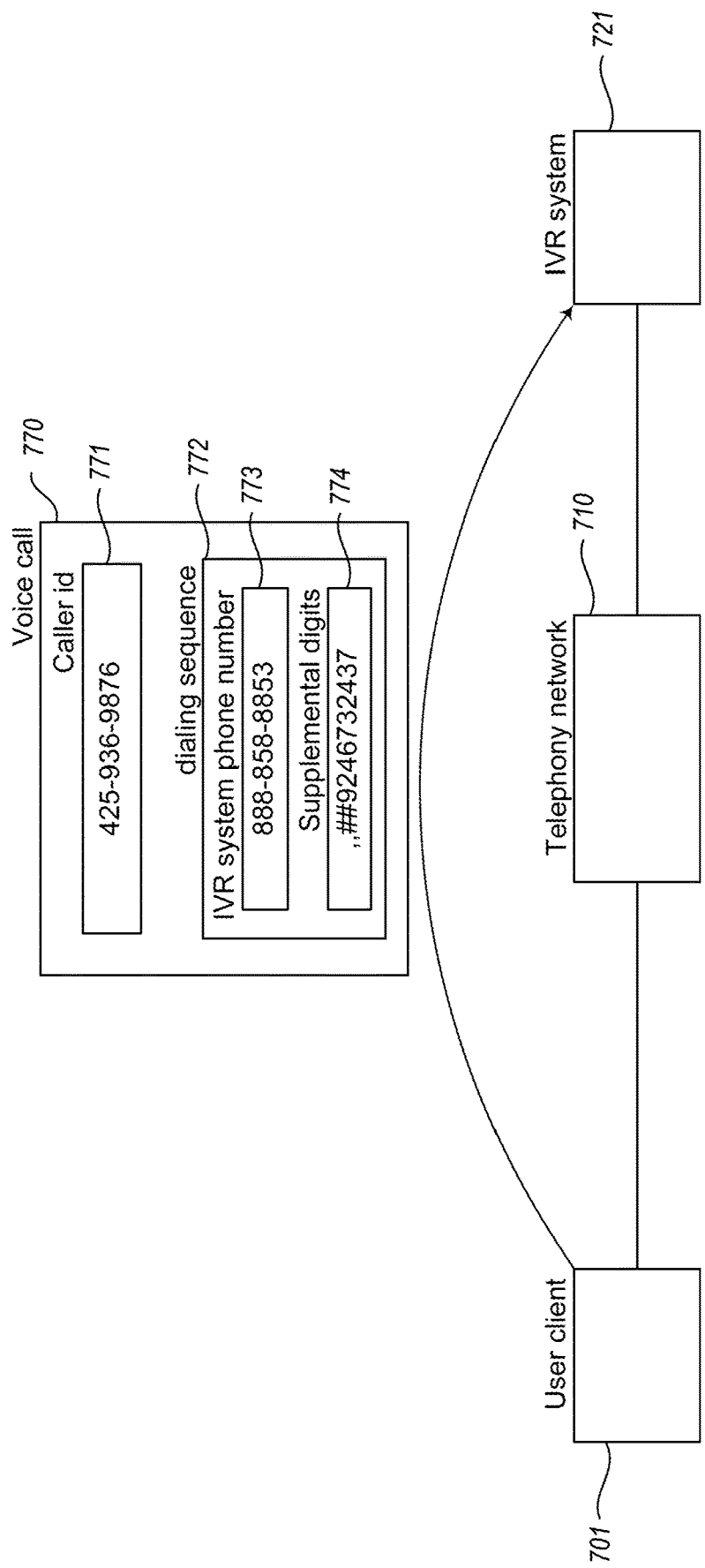
FIG. 7 is a data flow diagram showing the facility placing a support call in which information about the user's identity, level of authentication, and intent is directly encoded into the supplemental digits as an autonomous caller code.
Figure 8:
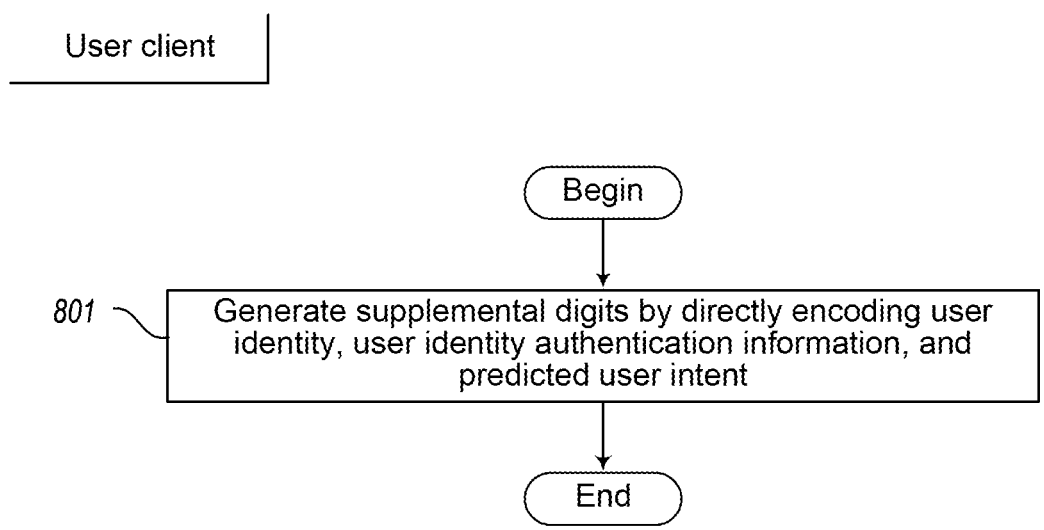
FIG. 8 is a flow diagram showing a process performed by the facility in the user client in some embodiments to generate the supplemental digits whose conveyance is shown in FIG. 7.

FIGS. 7 and 8 together show a first approach used by the facility to place a support call and determine its supplemental digits as an autonomous caller code.

FIG. 7 is a data flow diagram showing the facility placing a support call in which information about the user's identity, level of authentication, and intent is directly encoded into the supplemental digits as an autonomous caller code. The user client 701 uses the telephony network 710 to place a voice call 770 to the IVR system 721. The voice call conveys a caller id number 771 for the user client device that originated the call. It also has a dialing sequence 772 that is made up of the phone number 773 of the IVR system, as well as supplemental digits 774. In this example, supplemental digits begin with special dialing characters, in particular two commas followed by two pound signs. The commas each introduce a delay before the next character is dialed by the user client, such as a two-second delay. The pound signs each simulate the caller of a manually-dialed call pressing the pound button on the dialing keypad, which can be received by the IVR system as an attention code announcing that supplemental digits produced for consumption by the facility follow and should be processed with that understanding. The supplemental digits further contain the code "9246732437," into which the facility has encoded information about the user's identity, level of authentication, and/or intent. For example, in one approach the facility relies on the caller id "425-936-9876" to identify the user (via a mapping between telephone number and user id stored by the facility). The facility uses some of the digits of the code, e.g., the first eight digits, to encode information provided by the user to authenticate their identity, such as an identity verification string stored on a cookie stored on the user client, an encoding of one or more biometric characteristics captured from the user, etc. Other digits among the supplemental digits, such as the last two, are used to encode the user's predicted intent.

FIG. 8 is a flow diagram showing a process performed by the facility in the user client in some embodiments to generate the supplemental digits whose conveyance is shown in FIG. 7. In act 801, the facility generates the supplemental digits by directly encoding one or more of user identity, user identity authentication information or level, and/or predicted user intent, as described above in connection with supplemental digits 774. After act 801, this process concludes.

FIGS. 9-12 together show a second approach used by the facility to place a support call and determine its supplemental digits as a dynamic caller code.

Figure 9:
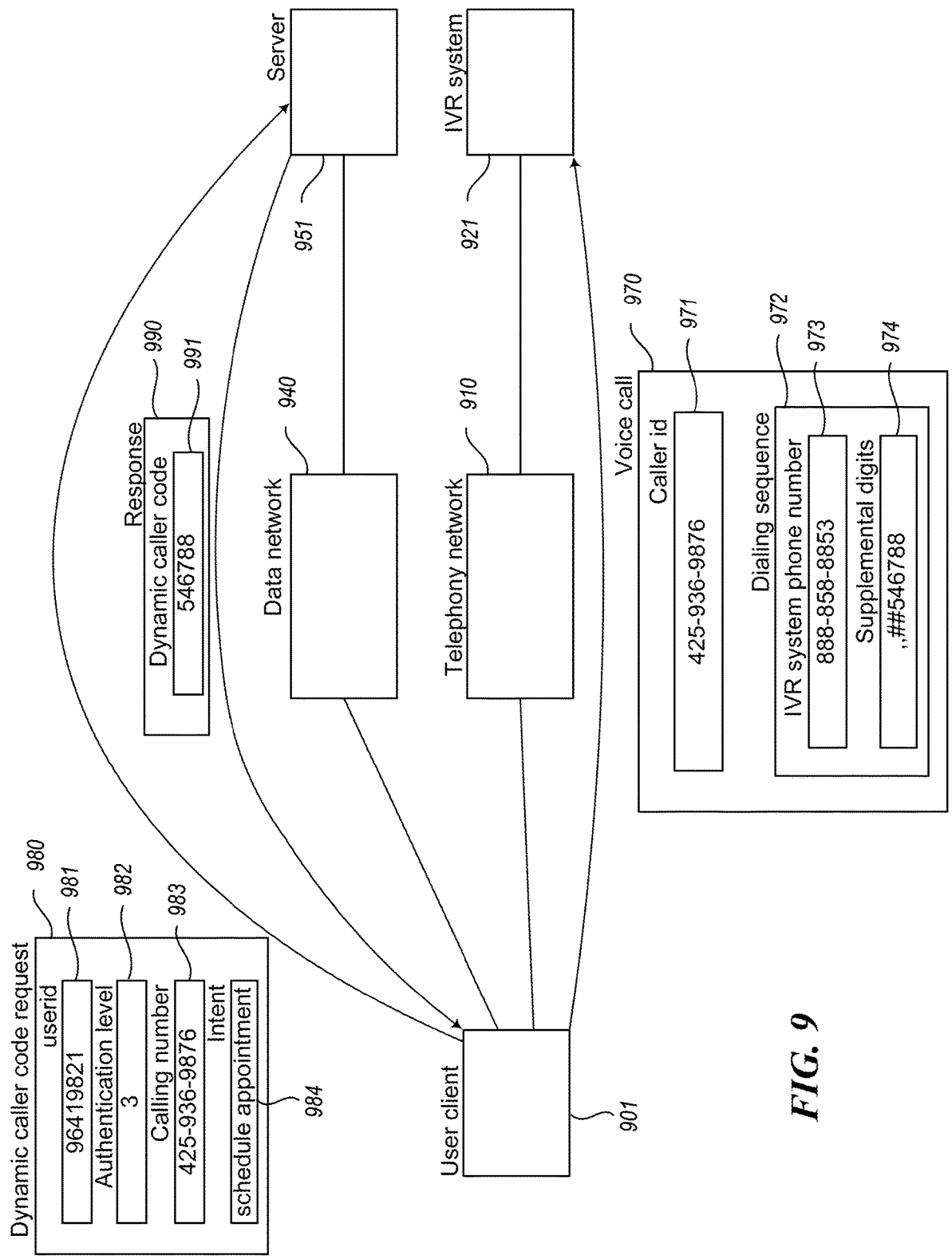
FIG. 9 is a data flow diagram showing the facility placing a support call whose supplemental digits make up a dynamic caller code that refers to information about the call earlier provided to the server by the user client via a data connection.

FIG. 9 is a data flow diagram showing the facility placing a support call whose supplemental digits make up a dynamic caller code that refers to information about the call earlier provided to the server by the user client via a data connection. In some embodiments, the facility sends a dynamic caller code request 980 from the user client 901 to the server 951. In some embodiments, the facility sends this request immediately before performing act 303 shown in FIG. 3 to display the calling control, so that the dynamic caller code that is received by the user client from the server in the response to this request is available for populating into the calling control when it is displayed. In some embodiments, the user client sends the dynamic caller code request immediately before act 305 shown in FIG. 3, in response to activation of the control, to at this point determine the dynamic caller code that should be used as the supplemental digit when placing the voice call in act 305.

The dynamic caller code request contains information that will be stored by the server in connection with the dynamic caller code assigned by the server in response to receiving the request. This information will be used by the facility to process the support call when it is later placed. As shown, the dynamic caller code request includes a user id 981 that uniquely identifies the user to the organization, an authentication level 982 that specifies the level or degree to which the user client has authenticated the user as corresponding to the user id, a calling number 983 that will be populated into the caller id of the support call when it is later placed, and an intent 984 predicted for the user at the present time. In various embodiments, the facility uses various network security techniques to protect and ensure the integrity and legitimacy of the contents of the dynamic caller code request, such as a secure connection, payload encryption, cryptographic signatures, etc. When the server receives the request, it assigns a dynamic caller code; stores the contents of the dynamic caller code request with the assigned dynamic caller code; and returns to the user client a response 990 containing the dynamic caller code 991.

Subsequently, such as when the user activates the calling control on the user client, the user client places a support voice call 970 to the IVR system 921 via the telephony network 910. The voice call 970 includes a caller id indication 971 reflecting the telephone number of the user client, and a dialing sequence 972. The dialing sequence 972 begins with the phone number 973 of the IVR system, followed by supplemental digits 974. Again, these supplemental digits begin with special dialing characters designed to alert the IVR system that it should treat the remainder of the supplemental digits as a code describing the support call. In this case, the remaining supplemental digits make up the dynamic caller code 991 enclosed in the response 990 to the dynamic caller code request. When the IVR system passes the dynamic caller code to the server, the server retrieves the information from the dynamic caller code request for use in generating the information to be displayed by the agent client.

Figure 10:
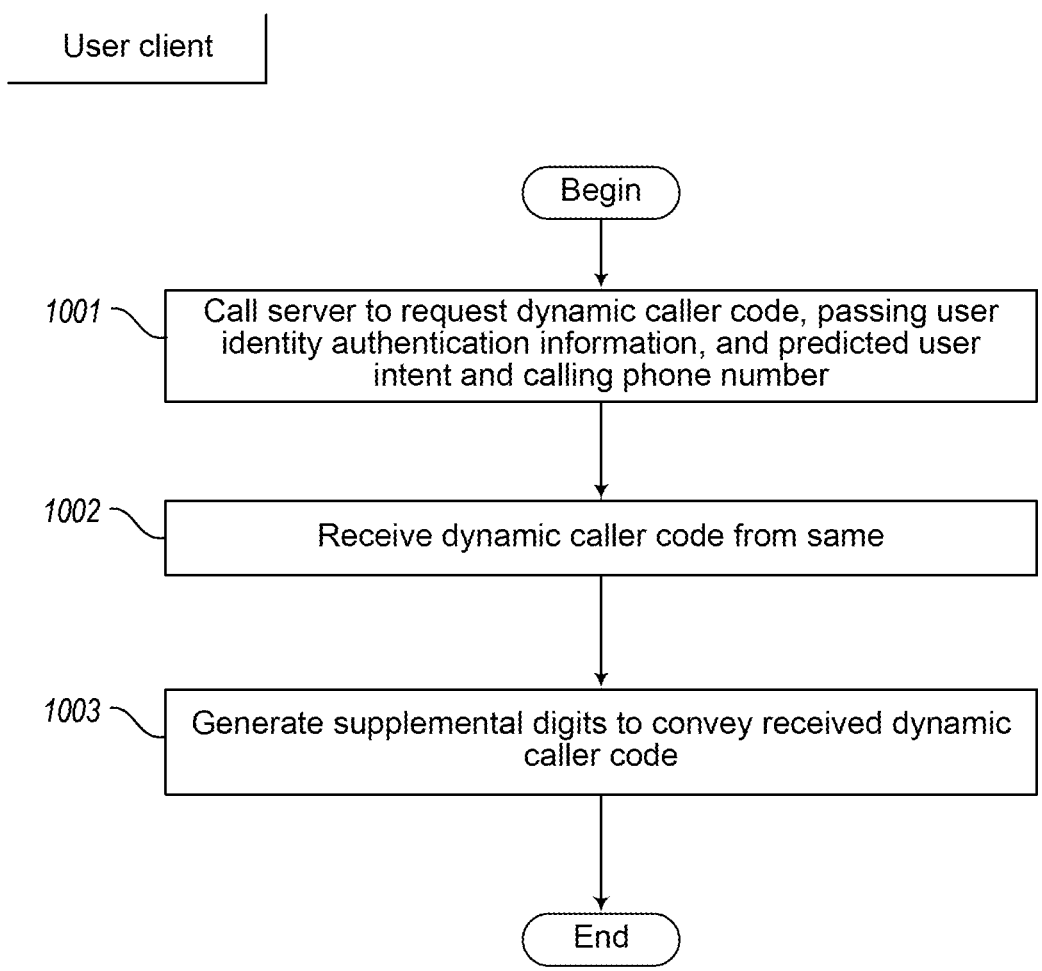
FIG. 10 is a flow diagram showing a process performed by the facility in some embodiments in the user client in order to generate the supplemental digits 974 used for support call 970 shown in FIG. 9.

FIG. 10 is a flow diagram showing a process performed by the facility in some embodiments in the user client in order to generate the supplemental digits 974 used for support call 970 shown in FIG. 9. In act 1001, the facility calls the server to request a dynamic caller code passing information such as the information shown in dynamic caller code request 980 of FIG. 9. In act 1002, the facility receives from the server the dynamic caller code that it has assigned in response to the dynamic caller code request. In act 1003, the facility generates supplemental digits to convey the dynamic caller code received in act 1002. After act 1003, this process concludes.

Figure 11:
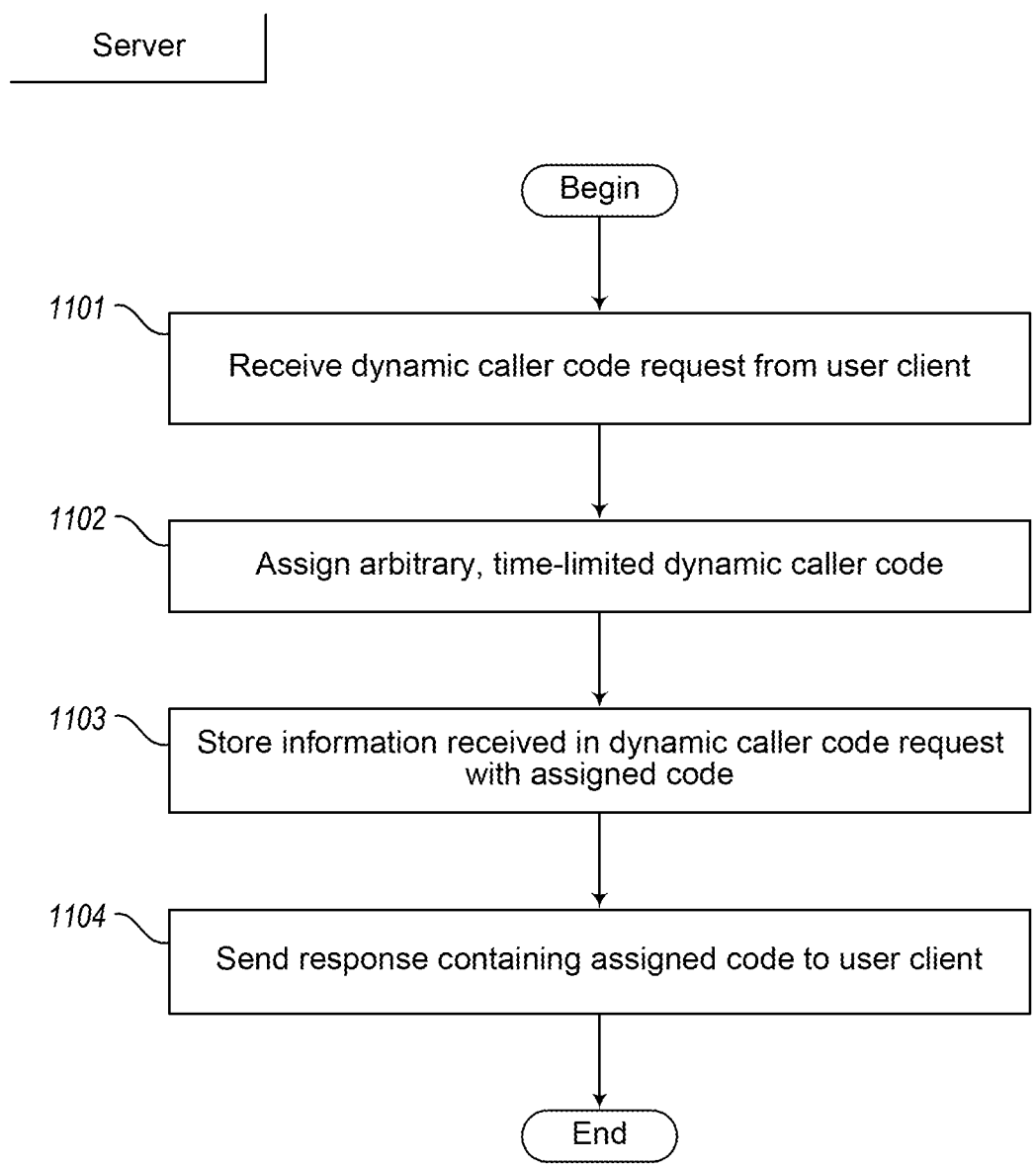
FIG. 11 is a flow diagram showing a process performed by the facility in the server in order to process a dynamic caller code request.

FIG. 11 is a flow diagram showing a process performed by the facility in the server in order to process a dynamic caller code request. In act 1101, the facility receives a dynamic caller code request from the user client. In act 1102, the facility assigns an arbitrary, time-limited dynamic caller code in response to the dynamic caller code request. In various embodiments, the facility establishes the expiration time for the assigned dynamic caller code based upon one of a variety of time intervals, such as ten seconds, thirty seconds, one minute, two minutes, five minutes, ten minutes, thirty minutes, one hour, two hours, five hours, etc. In act 1103, the facility stores information received in the dynamic caller code request with the assigned code, such as in a dynamic caller code table. In act 1104, the facility sends to the user client a response containing the dynamic caller code assigned in act 1102. After step 1104, this process concludes.

FIG. 12 is a table diagram showing sample contents of a dynamic caller code table used by the facility in some embodiments to store dynamic caller codes that have been assigned by the facility and the associated information. The table 1200 is made up of rows, such as rows 1201-1203, each corresponding to a different assigned dynamic caller code. Each row is divided into the following columns: a dynamic caller code column 1211 containing a dynamic caller code assigned by the facility; an expiration time column 1212 containing a date and time at which the dynamic caller code expires and must be replaced with a new dynamic caller code, such as one assigned in response to a supplemental dynamic caller code request; a user id column 1213 containing a user id uniquely identifying to the organization the user of the user client; an authentication column 1214 indicating a level to which the user client has authenticated the identity of its users; a calling number 1215 containing the phone number of the user client device from which a support call will later be received; and an intent column 1216 containing an intent predicted for the user based upon the user's interactions with the user client. For example, row 1202 reflects that the dynamic caller code 546785 was assigned a time that causes it to expire at 8:07:21 a.m. on Mar. 20, 2023, and that it was sent on behalf of the user having user id 96419821, who was authenticated to an authentication level of 3 by the user client, which has a calling number of 425-936-9876, and that this user has a predicted intent of scheduling an appointment. In various embodiments, the facility uses various techniques for assigning the dynamic caller code, such as selecting each randomly; assigning each sequentially; generating a globally unique identifier; etc.

While FIG. 12 shows a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

Figure 13:
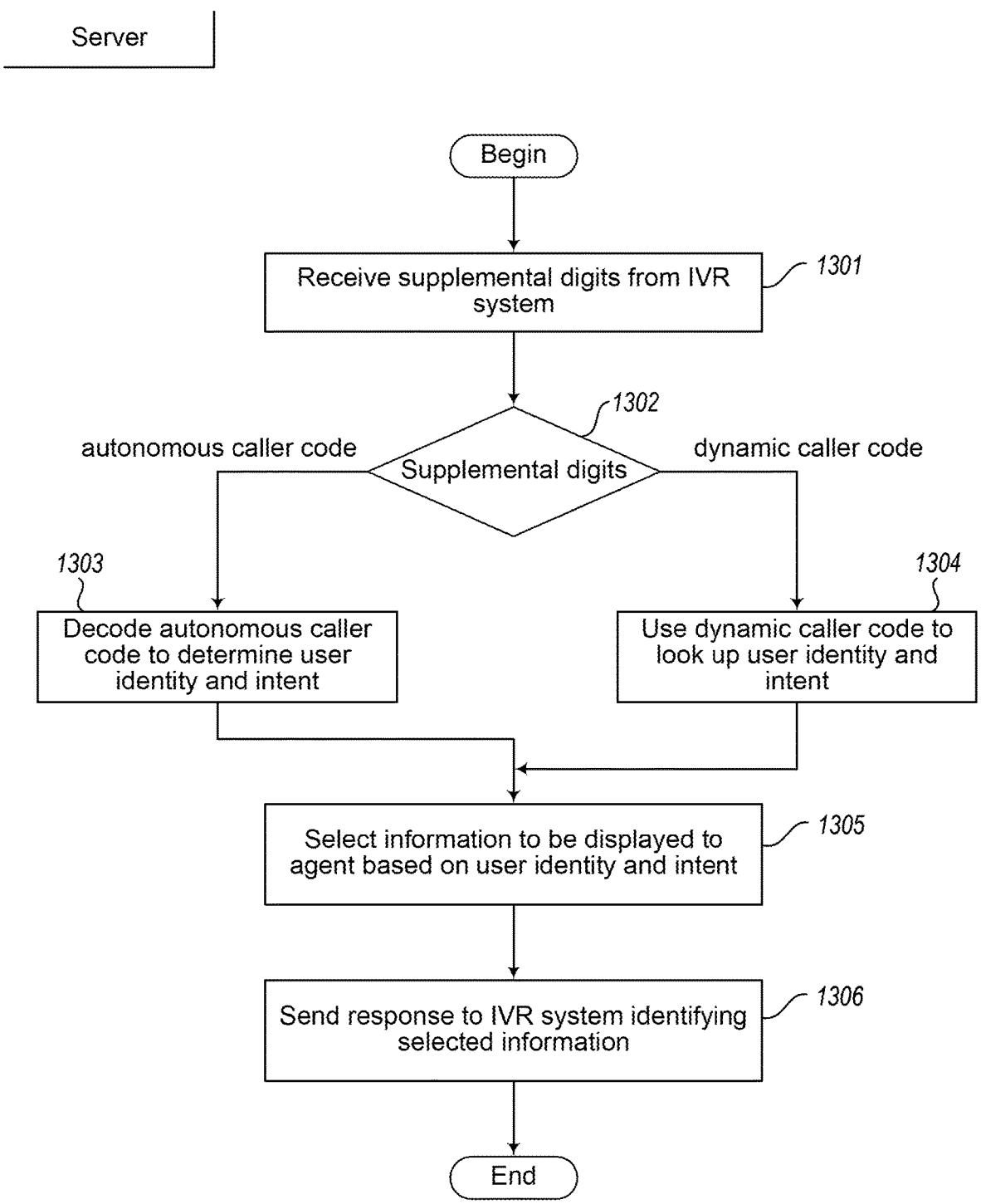
FIG. 13 is a flow diagram showing a process performed by the facility in the server in some embodiments to specify the information that is to be displayed to the agent to whom a received support call is routed.

FIG. 13 is a flow diagram showing a process performed by the facility in the server in some embodiments to specify the information that is to be displayed to the agent to whom a received support call is routed. In act 1301, the facility receives the supplemental dialing digits sent by the IVR system in act 601 shown in FIG. 6. In act 1302, if the supplemental digits make up an autonomous caller code generated by the user client without consulting with the server, then the facility continues in act 1303; on the other hand, if the supplemental digits make up a dynamic caller code assigned by the server, then the facility continues in act 1304. In various embodiments, the facility uses various techniques to determine the nature of the supplemental digits, such as the number of supplemental digits, or whether the supplemental digits make up an unexpired dynamic caller code contained in the dynamic caller code table.

In act 1303, the facility decodes the autonomous caller code that the supplemental digits make up to determine user identity and intent. After act 1303, the facility continues in act 1305.

In act 1304, the facility uses the dynamic caller code that the supplemental digits make up to look up user identity and intent information from the dynamic caller code table. After act 1304, the facility continues in act 1305.

In act 1305, the facility selects information to be displayed to the agent based upon user identity and intent information determined in act 1303 or 1304. For example, this can involve retrieving information about the user identified from the user information store 161 shown in FIG. 1, such as an electronic medical record system record established for the user to contain medical information for the user and related information. In various embodiments, the facility selects information based upon intent, such as selecting information needed to make an appointment on the user's behalf. In various embodiments, the selection of information reflects any remaining level of authentication that must or should be done by the agent before proceeding with the actions requested by the user in the support call, such as asking the user to provide certain information that the user is more likely than others to know, such as social security card number, medical insurance number, mother's maiden name, childhood nickname, etc. In act 1306, the facility sends a response to the IVR system identifying the information selected in act 1305, which the IVR system in turn causes to be displayed on the agent client. After act 1306, this process concludes.

In some embodiments (not shown), when the server is called by the IVR in response to the receipt of a report call, the server makes a call to the user client to obtain information useful in selecting information to be displayed. In some embodiments, this requested information is supplemental to information received by the server via the IVR in connection with an autonomous caller code or dynamic caller code. In some embodiments, this call by the server to the user client enables the server to obtain information that would have been provided by the user client in a dynamic caller code request, such as in cases where the dynamic caller code request was not sent by the user client, or the dynamic caller code sent by the server to the client has expired, or the server's record of the dynamic caller code provided by the user client has been compromised.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a user computing system, comprising:
collecting information from use of the user computing system by a user, the information comprising information for predicting an intent of the user;
causing a control for placing a telephone call to a predetermined phone number to be presented;
receiving input activating the control;
in response to receiving the input:
determining a value representing at least a portion of the collected information, the value representing at least the predicted intent of the user, the value being usable as a supplemental dialing sequence;
generating a dialing sequence in which the predetermined phone number is followed by the determined value; and
causing the generated dialing sequence to be performed to initiate a phone call to the predetermined phone number which, as part of the initiated call, receives the portion of the dialing sequence corresponding to the determined value,
such that the determined value is available to a second computing system associated with the predetermined number to access information for use in the initiated call.

2. The method of claim 1 wherein the collected information further comprises at least one of information identifying the user or information about identity authentication of the user by the user computing system.

3. The method of claim 1 wherein the determined value autonomously encodes the information it represents.

4. The method of claim 1, further comprising:
sending the information represented by the determined value to a server; and
receiving from the server a code assigned by the server to the information represented by the determined value,
and wherein the determining determines the received code.

5. The method of claim 1, further comprising, in the second computing system:
receiving the determined value received at the predetermined phone number;
using the determined value to retrieve information relevant to the use of the user computing system; and
causing the retrieved information to be displayed to a person to whom the initiated call is routed.

6. One or more instances of computer-readable media collectively storing a data structure, the one or more instances of computer-readable media not constituting a transitory propagating carrier wave or data signal, the data structure comprising:
   a plurality of entries, each entry comprising:
      information received from a user computing system that may place a phone call to a call center, the information reflecting:
         one or more aspects of use of the user computing system during a prior period of time; and
         a predicted intent of a user of the user computer system; and
      a dynamic caller identifier assigned to the information upon its receipt from the user computing system,
such that, for each entry, when a phone call is received by the call center whose dialing sequence conveys to the call center the entry's dynamic caller identifier, the entry's dynamic caller identifier is usable to retrieve the entry's information for use in conducting the phone call.

7. The one or more instances of computer-readable media of claim 6, each entry further comprising:
   an expiration time determined for the entry.

8. The one or more instances of computer-readable media of claim 6 wherein, for each entry, the information comprises information provided to the user computer system authenticating a person using the user computer system.

9. The one or more instances of computer-readable media of claim 6 wherein, for each entry, the information comprises a level of authentication performed by the user computer system with respect to a person using the user computer system.

10. The one or more instances of computer-readable media of claim 6 wherein, for each entry, the predicted intent of the person using the user computing system is determined based on the one or more aspects of use of the user computing system.

11. The one or more instances of computer-readable media of claim 6 wherein, for each entry, the information comprises a telephone number assigned to the user computer system.

12. One or more instances of computer-readable media collectively having contents configured to cause a computing system to perform a method, the one or more instances of computer-readable media not constituting a transitory propagating carrier wave or data signal, the method comprising:
   receiving a telephone call;
   as part of the telephone call, receiving a supplemental dialing sequence, the supplemental dialing sequence including an indication of an intent of a person using a user computing system;
   discerning a value to which the supplemental dialing sequence corresponds, the discerned value indicating the intent of the person using a user computer system;
   using the discerned value to retrieve information relevant to the use of the user computing system placing the telephone call; and
   causing the retrieved information to be displayed to a person to whom the received call is routed.

13. The one or more instances of computer-readable media of claim 12 wherein the method further comprises:
   determining a callerid number sent with the received phone call; and
   also using the determined callerid number in retrieving the information.

14. The one or more instances of computer-readable media of claim 12 wherein the discerned value represents a user identifier identifying a person using the user computing system.

15. The one or more instances of computer-readable media of claim 12 wherein the discerned value represents information provided to the user computer system authenticating a person using the user computer system.

16. The one or more instances of computer-readable media of claim 12 wherein the discerned value represents a level of authentication performed by the user computer system with respect to a person using the user computer system.

17. The one or more instances of computer-readable media of claim 12, wherein the intent of the person using the user computer system is inferred from one or more activities performed by the user computing system.

18. The one or more instances of computer-readable media of claim 12 wherein the discerned value represents actions performed by the user computer system.

19. The one or more instances of computer-readable media of claim 12 wherein the discerned value autonomously encodes the information it represents.

20. The one or more instances of computer-readable media of claim 12 wherein the method further comprises:
   receiving the information represented by the determined value from the user computing system via a data connection with the user computing system;
   assigning the discerned value to the received information; and
   returning the assigned value to the user computing system via the data connection.

* * * * *